United States Patent
Takeoka et al.

(10) Patent No.: US 10,176,417 B2
(45) Date of Patent: Jan. 8, 2019

(54) WIRELESS COMMUNICATION DEVICE AND ARTICLE PROVIDED WITH COMMUNICATION DEVICE

(71) Applicant: Murata Manufacturing Co., Ltd., Nagaokakyo-shi, Kyoto-fu (JP)

(72) Inventors: Makoto Takeoka, Nagaokakyo (JP); Noboru Kato, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 51 days.

(21) Appl. No.: 15/186,616

(22) Filed: Jun. 20, 2016

(65) Prior Publication Data

US 2016/0292559 A1    Oct. 6, 2016

Related U.S. Application Data

(63) Continuation of application No. PCT/JP2014/080189, filed on Nov. 14, 2014.

(30) Foreign Application Priority Data

Dec. 24, 2013 (JP) .................................. 2013-264844

(51) Int. Cl.
G06K 19/00 (2006.01)
G06K 19/07 (2006.01)
G06K 19/077 (2006.01)

(52) U.S. Cl.
CPC ... G06K 19/0723 (2013.01); G06K 19/07784 (2013.01)

(58) Field of Classification Search
USPC ......................... 235/435, 439, 451, 487, 492
See application file for complete search history.

(56) References Cited

U.S. PATENT DOCUMENTS

| 6,028,559 A * | 2/2000 | Satoh ....................... H01Q 1/36 |
| | | 343/742 |
| 2009/0166434 A1 | 7/2009 | Taniguchi et al. |
| 2011/0059694 A1* | 3/2011 | Audic ...................... H04B 5/00 |
| | | 455/41.1 |
| 2014/0247192 A1 | 9/2014 | Ikemoto |

FOREIGN PATENT DOCUMENTS

| JP | 10-303635 A | 11/1998 |
| JP | 2004-126750 A | 4/2004 |
| WO | 2009/081683 A1 | 7/2009 |
| WO | 2013/114978 A1 | 8/2013 |

OTHER PUBLICATIONS

Official Communication issued in International Application PCT/JP2014/080189, dated Feb. 24, 2015.

* cited by examiner

*Primary Examiner* — Matthew Mikels
(74) *Attorney, Agent, or Firm* — Keating & Bennett, LLP

(57) ABSTRACT

A wireless communication device includes a loop antenna that wirelessly communicates with a device of another party through an occurrence of an eddy current, a parallel inductor connected in parallel to the loop antenna, and a wireless IC element that is connected to the parallel inductor and that processes a transmission/reception signal. At least the parallel inductor and the wireless IC element provide a predetermined resonant frequency.

20 Claims, 7 Drawing Sheets

US 10,176,417 B2

WIRELESS COMMUNICATION DEVICE AND ARTICLE PROVIDED WITH COMMUNICATION DEVICE

CROSS-REFERENCE TO RELATED APPLICATIONS

This is a continuation application of International Application No. PCT/JP2014/080189, with an international filing date of Nov. 14, 2014, which claims priority of Japanese Patent Application No. 2013-264844 filed on Dec. 24, 2013, the contents of both of which are incorporated herein by reference.

BACKGROUND OF THE INVENTION

1. Field of the Invention

The present invention relates to wireless communication devices, such as a wireless communication device capable of communicating over a contactless communication system including a radio frequency identification (RFID) system, and relates to articles including such devices.

2. Description of the Related Art

Conventionally, an IC tag described in Japanese Patent Laid-open Publication No. 2004-126750 is known as an IC tag used in a contactless communication system. In an IC tag of this type, an antenna and an IC module are connected directly, and thus the impedance of the antenna needs to be matched with the complex conjugate of the impedance of the IC module. Therefore, an antenna for a contactless IC tag needs to be designed for different ICs or for different antenna shapes, leading to a problem in that it is highly difficult to design an antenna for an evaluation in a measurement system configured typically at 50Ω.

SUMMARY OF THE INVENTION

Preferred embodiments of the present invention provide a wireless communication device that has little or no variation in frequency characteristics, that reduces the difficulty in designing an antenna, and that is capable of communicating even when a plurality of devices are stacked, and also provide an article including such a device.

A wireless communication device according to a first aspect of various preferred embodiments of the present invention includes a loop that wirelessly communicates with a device of another party through an occurrence of an eddy current; a parallel inductor connected in parallel to the loop; and a wireless IC element that is connected to the parallel inductor and that processes a transmission/reception signal, wherein at least the parallel inductor and the wireless IC element define a predetermined resonant frequency.

An article according to a second aspect of various preferred embodiments of the present invention includes the wireless communication device and a metal body disposed in the vicinity of the loop.

In the wireless communication device, a current path of the loop and the parallel inductor is closed, and thus an eddy current flows in the loop in a direction in which the eddy current cancels a magnetic field signal from the device of the other party. In other words, upon the loop receiving a high-frequency signal (e.g., an HF-band signal at 13.56 MHz) radiated from the device of the other party, an eddy current occurs in the loop, and the wireless IC element operates due to a potential difference between both ends of the parallel inductor. In addition, a resonance circuit that adjusts the resonant frequency by at least the parallel inductor and the wireless IC element and the loop are divided in terms of their circuit functions. Thus, even when the antenna characteristics of the loop change due to the surrounding environment or the like, the frequency characteristics as a device are less likely to vary, and communication is possible even when a metal plate is in the proximity of the loop.

Furthermore, the inductance value of the loop has no influence on the resonant frequency, and thus the design of the loop (antenna), such as its size and shape, is able to be set with ease regardless of the electrical length of the loop. In addition, the loop is able to be shared with another communication system having a different communication frequency. The resonant frequency hardly changes even when the inductance value of the loop changes. Thus, even when a plurality of devices are disposed nearby, communication is possible without these devices affecting one another.

According to various preferred embodiments of the present invention, there is little or no variation in the frequency characteristics, the difficulty in designing an antenna is reduced, and communication is possible even when a plurality of devices are stacked.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 7A and 7B illustrate an article (pedometer) including the wireless communication device, in which FIG. 7A is an outer perspective view, and FIG. 7B is a perspective view schematically illustrating an internal structure.

DETAILED DESCRIPTION OF THE PREFERRED EMBODIMENTS

Figure 1:
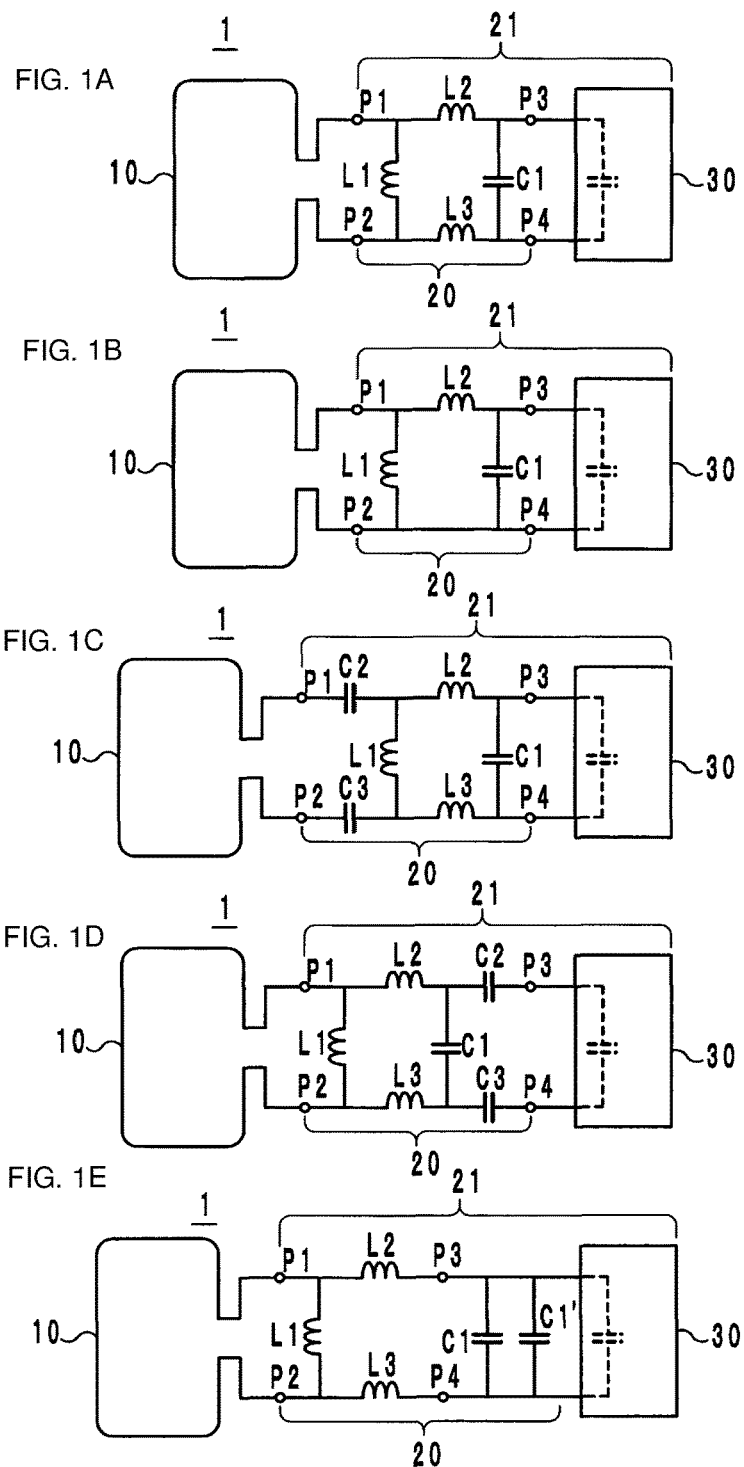
FIGS. 1A-1E are equivalent circuit diagrams of a basic circuit of a wireless communication device, in which FIG. 1A corresponds to a first example, FIG. 1B corresponds to a second example, FIG. 1C corresponds to a third example, FIG. 1D corresponds to a fourth example, and FIG. 1E corresponds to a fifth example.

Hereinafter, preferred embodiments of a wireless communication device according to the present invention and of an article including such a device will be described with reference to the accompanying drawings. It is to be noted that the components that are common among the drawings are given identical reference characters, and duplicate descriptions thereof will be omitted.

First through fifth examples of a wireless communication device are illustrated in FIGS. 1A through 1E, respectively.

These wireless communication devices preferably are for an HF-band RFID system with a communication frequency band of 13.56 MHz, for example. A wireless communication device of the first example includes a loop 10 that wirelessly communicates with a device of another party (e.g., a reader-writer of an HF-band RFID system) through an occurrence of an eddy current, a parallel inductor L1 connected in parallel to the loop 10, and a wireless IC element 30 that is connected to the parallel inductor L1 and that processes a transmission/reception signal. Furthermore, series inductors L2 and L3 are connected between both ends of the loop 10 and input and output units of the wireless IC element 30. A capacitor C1 is connected in parallel to the input and output units of the wireless IC element 30.

The inductors L1, L2, and L3 and the capacitor C1 define a feeder circuit 20 for the wireless IC element 30, and the feeder circuit 20 and an internal capacitor component provided in the wireless IC element 30 define a resonance circuit 21 having a predetermined frequency. It is to be noted that the resonance circuit 21 includes the capacitor component included in the wireless IC element 30. Here, both ends of the parallel inductor L1 are referred to as ports P1 and P2, and the input and output units of the wireless IC element 30 are referred to as ports P3 and P4.

As illustrated in FIG. 1B, in the second example, the inductor L3 is omitted, and only the series inductor L2 is provided. Thus, the size of the resonance circuit 21 is significantly reduced. As illustrated in FIG. 1C, in the third example, capacitors C2 and C3 are connected between the parallel inductor L1 and the loop 10. By providing the capacitors C2 and C3 in this manner, even in a case in which the loop antenna 10 is used also as an antenna for another communication system, a signal of the other communication system can be removed. As illustrated in FIG. 1D, in the fourth example, the capacitors C2 and C3 are provided between the parallel inductor L1 and the input and output units of the wireless IC element 30. The effect obtained by providing the capacitors C2 and C3 is the same as that of the third example. As illustrated in FIG. 1E, in the fifth example, another capacitor C1' is provided in parallel to the capacitor C1. The capacitor C1' is disposed in order to compensate the capacitance value of the capacitor C1.

Figure 5:
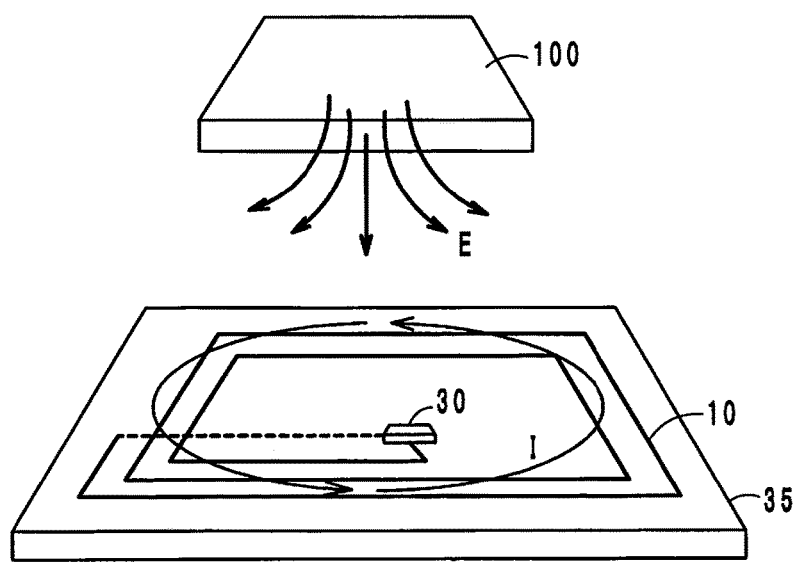
FIG. 5 is a schematic diagram for describing an operation of the wireless communication device.

The loop antenna 10 may be provided in a variety of shapes and sizes. The loop antenna 10 may be defined by a conductor pattern of a single turn. As illustrated in FIG. 5, the loop antenna 10 may be defined by a conductor pattern of a plurality turns provided on a substrate 35. Alternatively, the loop antenna 10 may be defined by a wire of a single turn or of a plurality turns. Providing the loop antenna 10 with a single-turn wire renders it unnecessary to wrap the wire onto the both sides when connecting to the parallel inductor L1 or to mount an end portion of the loop antenna 10 through bridge wiring. Thus, the mounting structure is simplified, and such a configuration is thus particularly preferable.

Figure 2:
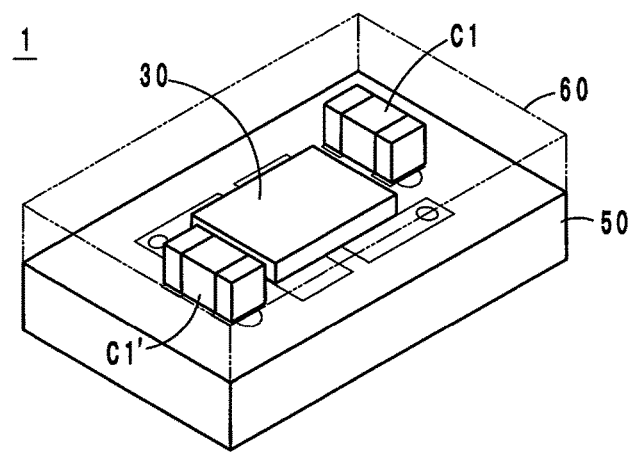
FIG. 2 is a perspective view illustrating the fifth example of the wireless communication device.
Figure 3:
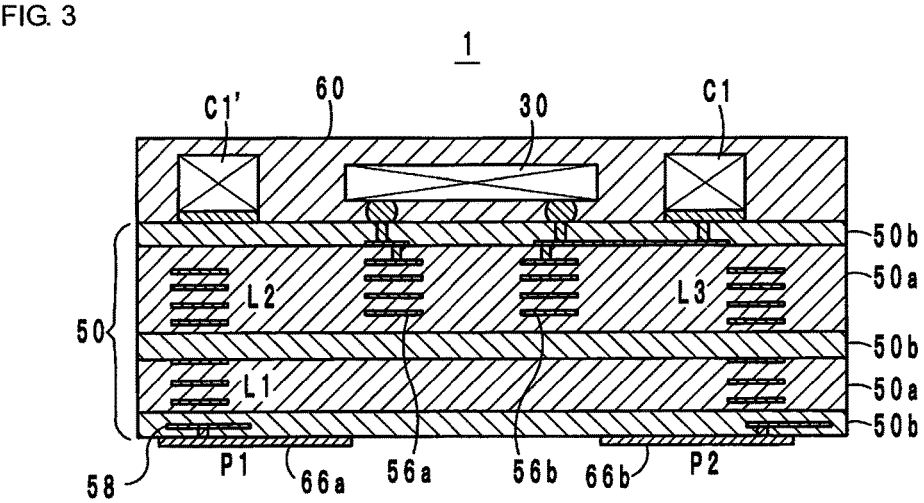
FIG. 3 is a sectional view illustrating the fifth example.

As illustrated in FIGS. 2 and 3, in the wireless communication device 1 of the fifth example having the circuit configuration described above, the wireless IC element 30 and the capacitors C1 and C1' of a chip type are mounted on a substrate 50 defined by magnetic layers 50a in which the inductors L1, L2, and L3 are embedded and non-magnetic layers 50b, and are sealed by a resin 60.

Figure 4:
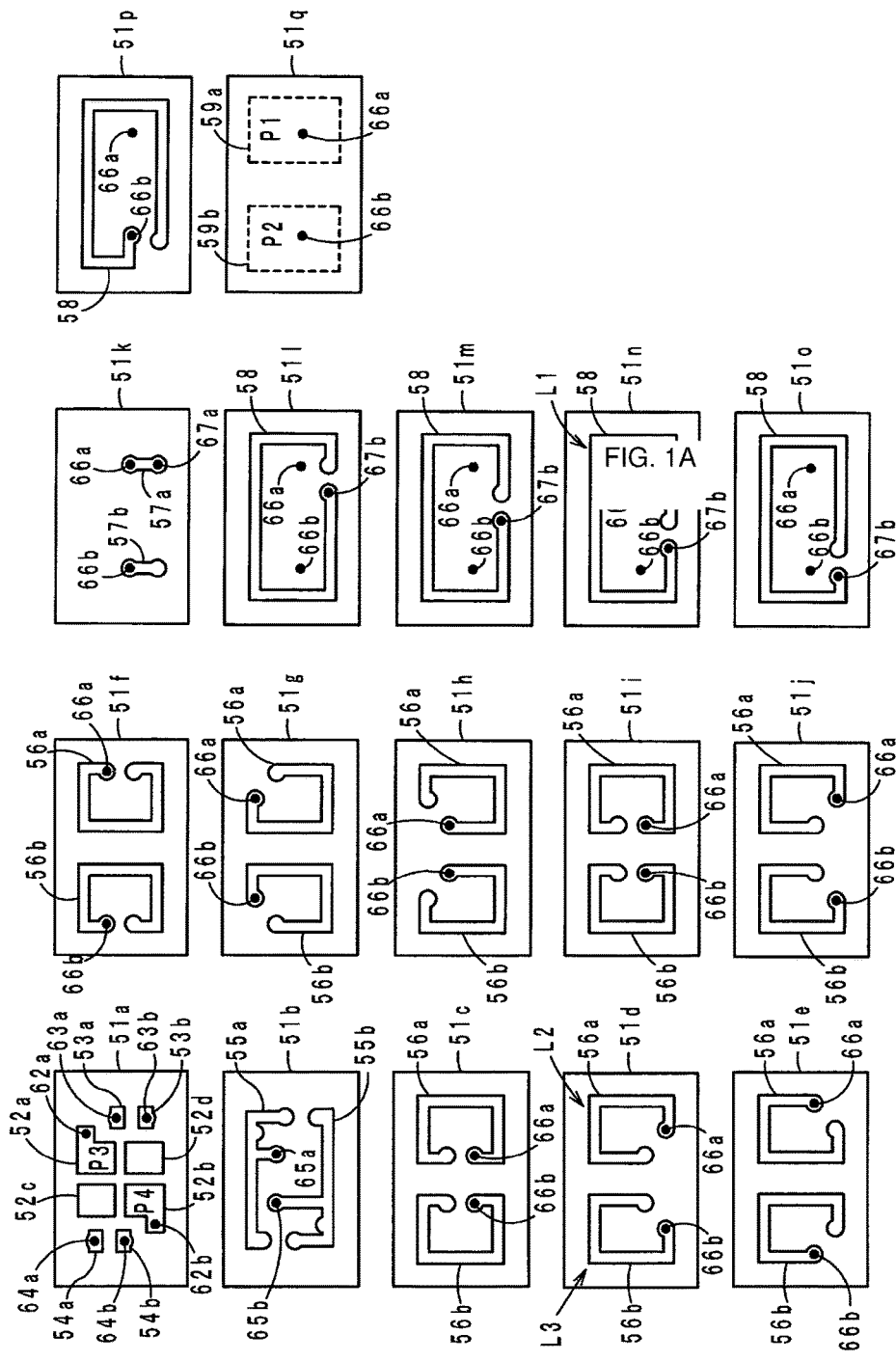
FIG. 4 illustrates an exploded plan view showing the multilayer structure of the fifth example.

Hereinafter, electrodes and conductor patterns of the inductors L1, L2, and L3 and so on embedded in the substrate 50 will be described with reference to FIG. 4. FIG. 4 illustrates sheets 51a through 51q of a non-magnetic body and a magnetic body in a state as viewed from the upper side of the substrate 50 (refer to FIG. 3).

Front surface side electrodes 52a through 52d, 53a, 53b, 54a, and 54b and via hole conductors 62a, 62b, 63a, 63b, 64a, and 64b are provided on and in the sheet 51a. Relay patterns 55a and 55b and via hole conductors 65a and 65b are provided on and in the sheet 51b. Conductor patterns 56a and 56b and via hole conductors 66a and 66b are provided on and in the sheets 51c through 51j. Relay patterns 57a and 57b and via hole conductors 66a, 66b, and 67a are provided on and in the sheet 51k. A conductor pattern 58, via hole conductors 66a, 66b, and 67b are provided on and in the sheets 51l through 51o. A conductor pattern 58 and via hole conductors 66a and 66b are provided on and in the sheet 51p. Back surface side electrodes 59a and 59b and via hole conductors 66a and 66b are provided on and in the sheet 51q.

The plurality of conductor patterns 58 are connected in a coil shape with the via hole conductors 67b interposed therebetween so as to define the parallel inductor L1. The plurality of conductor patterns 56a are connected in a coil shape with the via hole conductors 66a interposed therebetween so as to define the inductor L2. The plurality of conductor patterns 56b are connected in a coil shape with the via hole conductors 66b interposed therebetween so as to define the inductor L3.

The electrode 59a (port P1) in the lowermost layer is connected to an end portion of the conductor pattern 58 (one end of the inductor L1) on the sheet 51l with the via hole conductor 66a, the relay pattern 57a, and the via hole conductor 67a interposed therebetween. The electrode 59b (port P2) in the lowermost layer is connected to an end portion of the conductor pattern 58 (the other end of the inductor L1) on the sheet 51p with the via hole conductor 66b interposed therebetween.

The conductor pattern 56a on the sheet 51j that defines the inductor L2 is connected to the back surface side electrode 59a with the via hole conductor 66a, the relay pattern 57a, and the via hole conductor 66a interposed therebetween. The conductor pattern 56b on the sheet 51j that defines the inductor L3 is connected to the back surface side electrode 59b with the via hole conductor 66b, the relay pattern 57b, and the via hole conductor 66b interposed therebetween.

The electrode 52a (port P3) in the uppermost layer is connected to an end portion of the conductor pattern 56a (one end of the inductor L2) on the sheet 51c with the via hole conductor 62a, the relay pattern 55a, and the via hole conductor 65a interposed therebetween. The electrode 52b (port P4) in the uppermost layer is connected to an end portion of the conductor pattern 56b (one end of the inductor L3) on the sheet 51c with the via hole conductor 62b, the relay pattern 55b, and the via hole conductor 65b interposed therebetween. An end portion of the conductor pattern 56a (the other end of the inductor L2) on the sheet 51j is connected to the back surface side electrode 59a with the via hole conductor 66a interposed therebetween. An end portion of the conductor pattern 56b (the other end of the inductor L3) on the sheet 51j is connected to the back surface side electrode 59b with the via hole conductor 66b interposed therebetween.

In addition, the electrode 53a in the uppermost layer is connected to the electrode 52a in the uppermost layer and an end portion of the conductor pattern 56a (one end of the inductor L2) with the via hole conductor 63a, the relay pattern 55a, and the via hole conductor 65a interposed therebetween. The electrode 53b in the uppermost layer is connected to the electrode 52b in the uppermost layer and an end portion of the conductor pattern 56b (one end of the inductor L3) with the via hole conductor 63b, the relay pattern 55b, and the via hole conductor 65b interposed therebetween. The electrode 54a in the uppermost layer is connected to the electrode 52a in the uppermost layer and an end portion of the conductor pattern 56a (one end of the inductor L2) with the via hole conductor 64a, the relay pattern 55a, and the via hole conductor 65a interposed therebetween. The electrode 54b in the uppermost layer is connected to the electrode 52b in the uppermost layer and an end portion of the conductor pattern 56b (one end of the inductor L3) with the via hole conductor 64b, the relay pattern 55b, and the via hole conductor 65b interposed therebetween.

In the sheet 51a of the upper layer, the input and output terminals of the wireless IC element 30 are connected to the electrodes 52a and 52b (ports P3 and P4) with solder bumps or the like. The capacitor C1 is connected between the electrodes 53a and 53b, and the capacitor C1' is connected between the electrodes 54a and 54b.

In the wireless communication device 1, the current path of the loop antenna 10 and the parallel inductor L1 is closed, or in other words, a signal current circulates through a loop defined by the loop antenna 10 and the inductor L1. Thus, an eddy current flows in the loop antenna 10 in a direction in which the eddy current cancels a magnetic field signal from the device of the other party (a reader-writer of an RFID system). In other words, as illustrated in FIG. 5, upon the loop antenna 10 receiving a high-frequency signal E (e.g., an HF-band signal at 13.56 MHz) radiated from a reader-writer 100, an eddy current I occurs in the loop antenna 10, and the wireless IC element 30 operates due to a potential difference between the both ends of the parallel inductor L1. In addition, the resonance circuit 21 that adjusts the resonant frequency by at least the parallel inductor L1 and the wireless IC element 30 and the loop antenna are divided in terms of their circuit functions. In other words, the loop antenna 10 is merely a functional unit that produces an eddy current, and the resonance circuit defined by the inductor L1 and the wireless IC element 30 is a functional unit that isolates or selects a signal current having a predetermined communication frequency from the eddy current produced in the loop antenna 10. Thus, even when the antenna characteristics of the loop antenna 10 change due to the surrounding environment or the like, the frequency characteristics as a device are less likely to vary, and communication is possible even when a plurality of wireless communication devices are stacked or even when a metal plate is in the proximity of the loop antenna 10.

Furthermore, the inductance value of the loop antenna 10 has substantially no influence on the resonant frequency, and thus the design of the loop antenna 10 (antenna), such as its size and shape, is able to be set with ease regardless of the electrical length of the loop antenna 10. In addition, the loop antenna 10 is able to be shared with another communication system having a different communication frequency. In particular, as in wireless charging, the loop antenna 10 is able to effectively be shared with an antenna having a large inductance value. The resonant frequency of the resonance circuit 21 hardly changes even when the inductance value of the loop antenna 10 changes. Thus, even when a plurality of devices are disposed nearby, or for example, even when a plurality of wireless communication devices 1 (loop antennas 10) are brought closer within a range from about 0.5 mm to about 1.0 mm, communication is possible without these devices affecting one another.

As illustrated in FIG. 3, when the inductors L1, L2, and L3 are covered by the magnetic layer 50a, the inductors L1, L2, and L3 are less prone to an outside influence, and the operating characteristics thus stabilize. In particular, by embedding the inductor L1 connected in parallel to the loop antenna 10 into a multilayer body including a plurality of magnetic layers, the inductor L1 is able to have a closed magnetic circuit structure. Thus, the inductance value of the inductor L1 is less likely to be affected by an outside environment, and the L value and the resonant frequency characteristics in turn are able to be stabilized. In addition, by interposing the non-magnetic layer 50b between the inductor L1 and the inductors L2 and L3, the magnetic saturation of each of the inductors L1, L2, and L3 is able to be significantly reduced or prevented without increasing the inductance value of each of the inductors L1, L2, and L3.

The wireless communication device according to the present preferred embodiment preferably is a passive device that operates on a radio wave from a reader-writer serving as an energy source and does not require an embedded battery. Of course, the wireless communication device may be an active device.

With regard to information stored in the wireless IC element, a radio wave that has reached the antenna is reflected by varying the load of the wireless IC element, and the information is added onto the reflection wave and returned to the reader-writer.

Specifically, in the wireless communication device 1, an eddy current that flows in the loop antenna 10 is changed by changing the load (impedance) of the wireless IC element 30, and a high-frequency signal is transmitted to the reader-writer by varying the magnetic flux produced in the loop antenna 10. For example, when the load of the wireless IC element 30 becomes 0Ω, the load of the both ends of the loop antenna 10 decreases, and an eddy current that flows in the loop antenna 10 increases. As the eddy current increases, a radio wave from the reader-writer is further cancelled. On the other hand, when the load of the wireless IC element 30 reaches infinity, the load of the both ends of the loop antenna 10 increases, and the eddy current that flows in the loop antenna 10 decreases. As the eddy current decreases, the amount of the radio wave from the reader-writer that is cancelled decreases.

Now, the return loss characteristics of the wireless communication device will be described with reference to FIG. 6. The return loss characteristics have been obtained through a simulation in which the inductance values of the inductors L1, L2, and L3 are set to approximately 470 nH, 270 nH, and 270 nH, respectively, and the capacitance value of the capacitor C1 is set to about 100 pF in the wireless communication device 1 illustrated in FIG. 1A, for example. The verification has been carried out by setting the inductance value of the loop antenna 10 to the three values of approximately 800 nH, 1400 nH, and 200 nH, for example.

Figure 6:
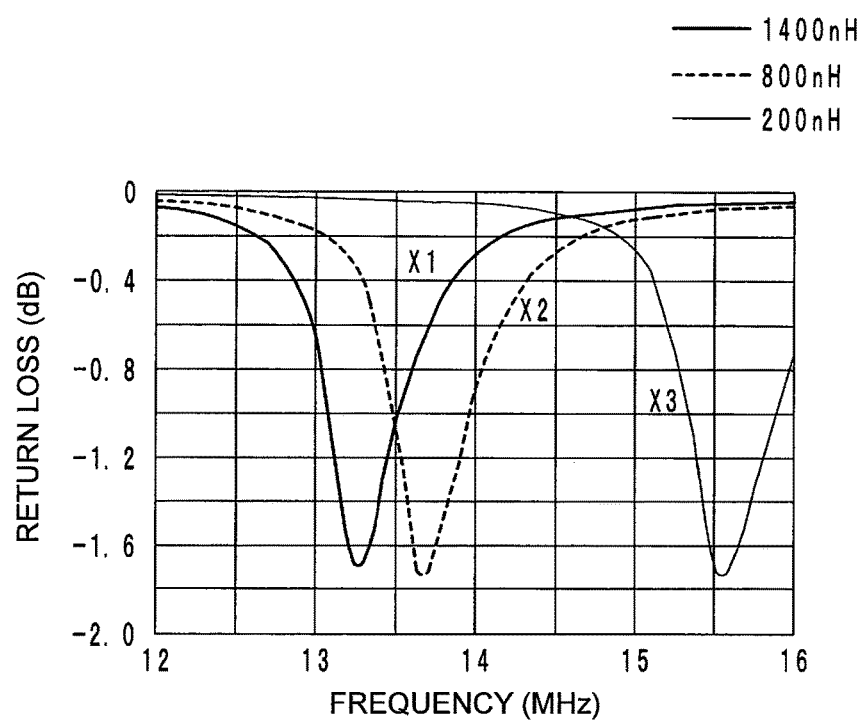
FIG. 6 is a graph illustrating the characteristics of the wireless communication device.

As can be seen clearly from FIG. 6, the resonant frequency obtained when the inductance value of the loop antenna is 1400 nH (see the curve X1) is relatively low, and the resonant frequency obtained when the inductance value is 800 nH (see the curve X2) is relatively high. In other words, when the inductance value of the loop antenna 10 is set within a range from 800 nH to 1400 nH, the variation range of the resonant frequency falls within a range of ±300 kHz. Here, the permissible value of the variation range of the resonant frequency is approximately 1 MHz or less.

When the ratio between the inductance value of the loop antenna 10 and the inductance value of the parallel inductor L1 is considered, $(800/470) \approx 1.7$ and $(1400/470) \approx 3$ are obtained, for example. In other words, it is preferable that the inductance value of the loop antenna 10 be no less than about 1.7 times the inductance value of the parallel inductor L1, and the resonant frequency varies only within about ±300 kHz in this case.

It is to be noted that the resonant frequency obtained when the inductance value of the loop antenna 10 is about 200 nH (see the curve X3) varies into a comparatively high band.

As long as the wireless communication device 1 includes a loop antenna 10 defined by a conductor pattern of a single turn, the wireless communication device 1 is able to communicate with a reader-writer or the like even if a metal body is disposed in the vicinity of the loop antenna 10. Therefore, the wireless communication device 1 is able to be embedded into a variety of articles.

Figure 7A:
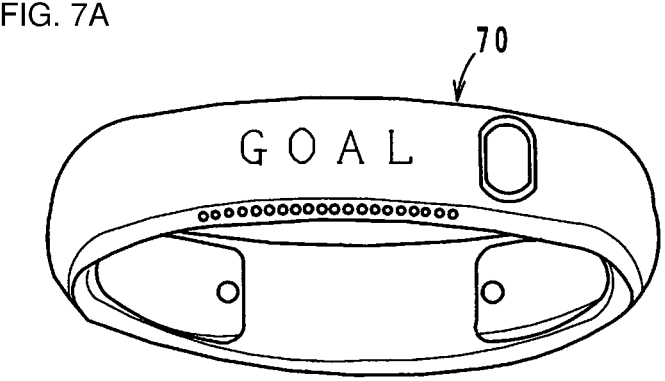
Figure 7B:
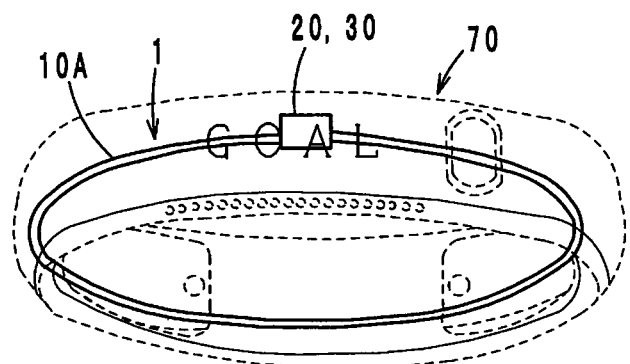

FIGS. 7A and 7B illustrate an activity tracker (pedometer 70) in which the wireless communication device 1 is embedded. An activity tracker as represented by the pedometer 70 is a health-related product that is worn on a human body to measure the daily amount of exercise, the consumed calories, or the like, and a lightweight activity tracker of a bracelet type is popular in recent years. In order to transfer measurement data from the pedometer 70 to a personal computer or a smartphone over wireless communication, such as Bluetooth (registered trademark) or W-LAN, and to check the data, pairing between the devices (device authentication function) is necessary. However, pairing over Bluetooth (registered trademark) is complicated.

Therefore, the wireless communication device 1 may be embedded into an article such as the pedometer 70 by using a loop-shaped metal body of a single turn (metal wire 10A) as a loop antenna. A mobile terminal can individually identify the pedometer 70 by communicating with the wireless communication device 1, which thus facilitates pairing. Even if a metal body is disposed on the pedometer 70 and this metal body is in the proximity of the wire 10A, communication is of course possible.

Figure 8:
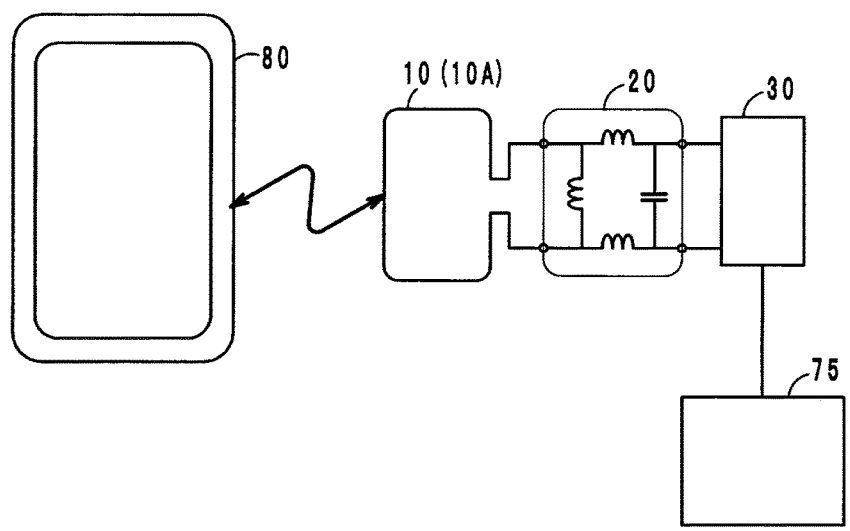
FIG. 8 is an illustration for describing a communication state between the wireless communication device and a mobile terminal.

Furthermore, as illustrated in FIG. 8, if the wireless IC element 30 that uses an RFID system or the like equipped with an I²C function is connected to a microcomputer 75 embedded in the pedometer 70, not only is pairing able to be achieved, but also the data (the number of steps or the consumed calories) stored in the microcomputer 75 is able to be transferred to a smartphone 80 via the loop antenna 10 (wire 10A).

Figure 9:
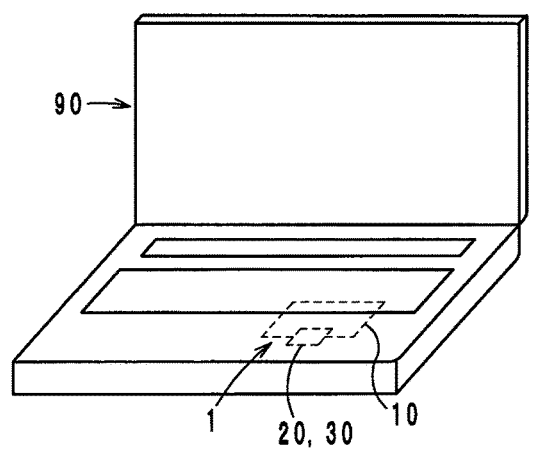
FIG. 9 is an illustration for describing an article (personal computer) including the wireless communication device.

In a personal computer 90 illustrated in FIG. 9, in place of a conventional bar code, the wireless communication device 1 including the loop antenna 10 is provided on the base surface of the metal housing. Thus, the personal computer 90 is able to be managed by using the wireless communication device 1, and by connecting the microcomputer in the personal computer 90 to the wireless IC element 30, the personal computer 90 and a host computer are able to be paired, or data is able to be exchanged therebetween.

Other Preferred Embodiments

It is to be noted that wireless communication devices and articles according to the present invention are not limited by the various preferred embodiments described above, and various modifications can be made thereto within the spirit of the present invention.

In particular, the configuration, the shape, and so on of details of the conductor patterns or the wires constituting the loop antenna can be set as desired. In addition, the wireless communication device can be embedded broadly into a variety of articles aside from a pedometer and a personal computer.

As described thus far, preferred embodiments of the present invention are useful in a wireless communication device and, in particular, excel in that there is little or no variation in the frequency characteristics, the difficulty in designing an antenna is significantly reduced, and communication is possible even when a plurality of devices are stacked.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A wireless communication device, comprising:
   a loop antenna that wirelessly communicates with a device of another party through an eddy current;
   a parallel inductor connected in parallel to the loop antenna; and
   a wireless IC that is connected to the parallel inductor and that processes a transmission/reception signal; wherein
   at least the parallel inductor and the wireless IC provide a predetermined resonant frequency; and
   a current path of the loop antenna and the parallel inductor is closed.

2. The wireless communication device according to claim 1, wherein an inductance value of the loop antenna is not less than 1.7 times an inductance value of the parallel inductor.

3. The wireless communication device according to claim 1, wherein the parallel inductor is covered by a magnetic body.

4. The wireless communication device according to claim 1, wherein the loop antenna includes a conductor pattern including a single turn or including a plurality of turns.

5. The wireless communication device according to claim 1, wherein the loop antenna includes a wire including a single turn or including a plurality of turns.

6. The wireless communication device according to claim 1, further comprising series inductors connected to the loop antenna and the wireless IC, and a capacitor connected in parallel to the wireless IC.

7. The wireless communication device according to claim 1, further comprising a resonance circuit including a capacitor provided in the wireless IC and a feeder circuit.

8. The wireless communication device according to claim 7, wherein the feeder circuit includes a plurality of inductors and a capacitor.

9. The wireless communication device according to claim 1, further comprising capacitors connected between the parallel inductor and the loop antenna.

10. The wireless communication device according to claim 1, further comprising capacitors connected between the parallel inductor and the wireless IC.

11. The wireless communication device according to claim 1, further comprising capacitors connected in parallel.

12. The wireless communication device according to claim 1, further comprising a substrate including magnetic layers and non-magnetic layers, chip capacitors mounted on the substrate, and inductors embedded in the substrate.

13. The wireless communication device according to claim 1, wherein the wireless communication device is one of a passive device and an active device.

14. An article, comprising:
    a wireless communication device; and
    a metal body; wherein
    the wireless communication device includes:

a loop antenna that wirelessly communicates with a device of another party through an eddy current;

a parallel inductor connected in parallel to the loop antenna; and a wireless IC element that is connected to the parallel inductor and that processes a transmission/reception signal; wherein at least the parallel inductor and the wireless IC element provide a predetermined resonant frequency; and the metal body is disposed in an area of the loop antenna.

15. The article according to claim 14, wherein the article is one of an activity tracker and a computer.

16. The article according to claim 14, wherein an inductance value of the loop antenna is not less than about 1.7 times an inductance value of the parallel inductor.

17. The article according to claim 14, wherein the parallel inductor is covered by a magnetic body.

18. The article according to claim 14, wherein the loop antenna includes a conductor pattern including a single turn or including a plurality of turns.

19. An HF-band RFID system comprising the wireless communication device according to claim 1.

20. An HF-band RFID system comprising the article according to claim 14.

* * * * *